April 12, 1932.    R. W. JOHNSON    1,853,431
AUTOMATIC CONTROL FOR BURNERS
Filed Oct. 10, 1928    10 Sheets-Sheet 1

INVENTOR.
Roy W. Johnson
BY Bottum Hudnall
Lechner McNamara & Michael
ATTORNEY.

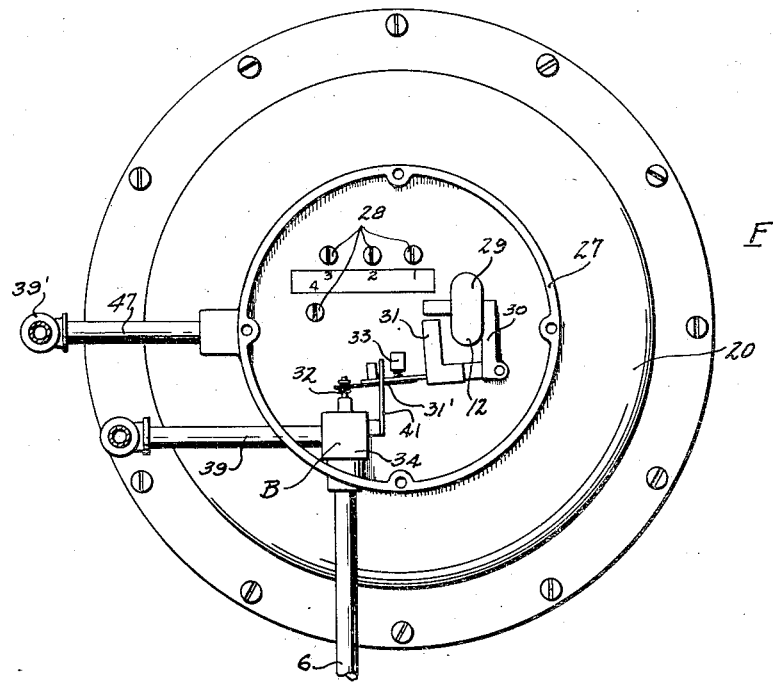

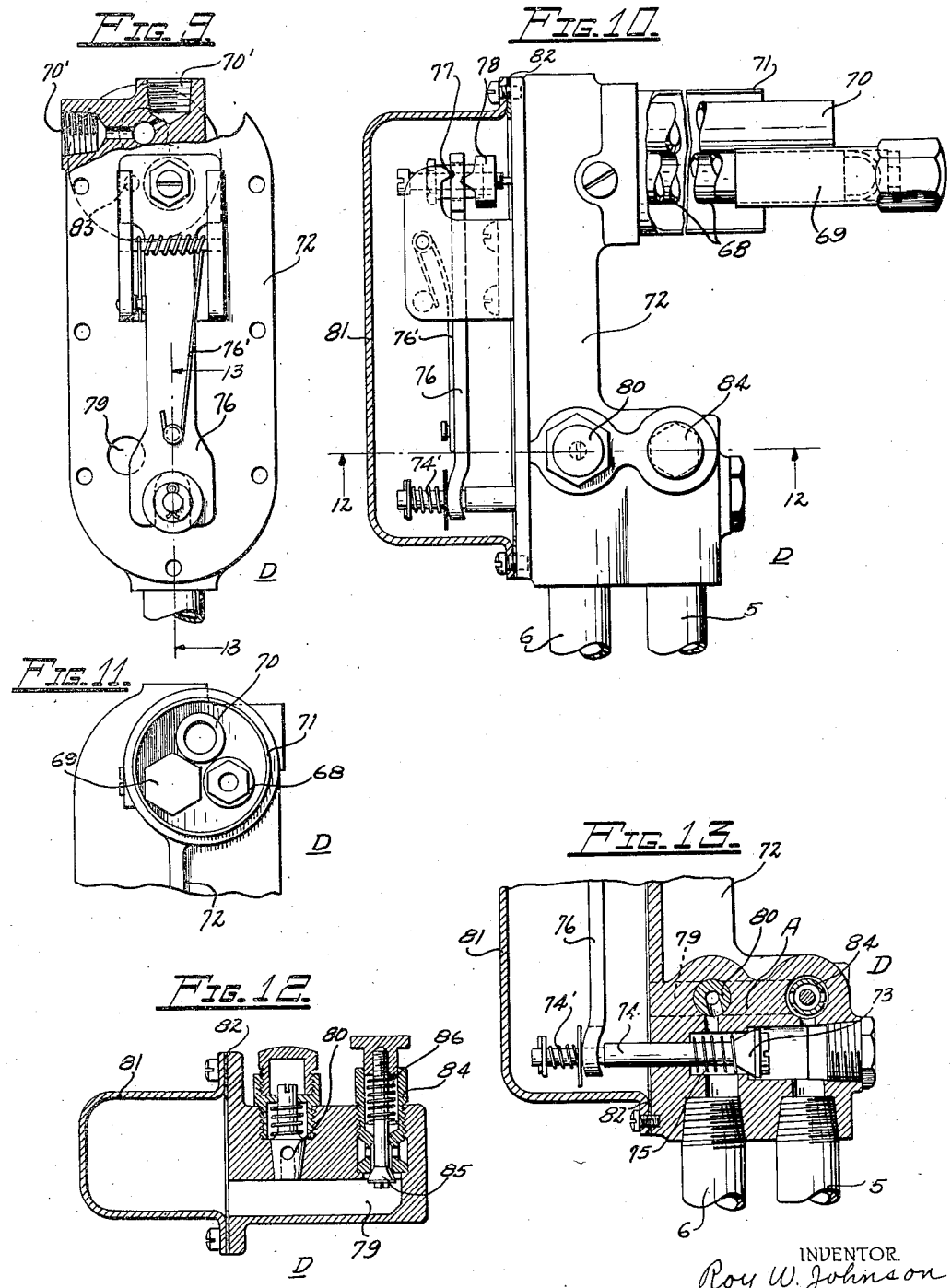

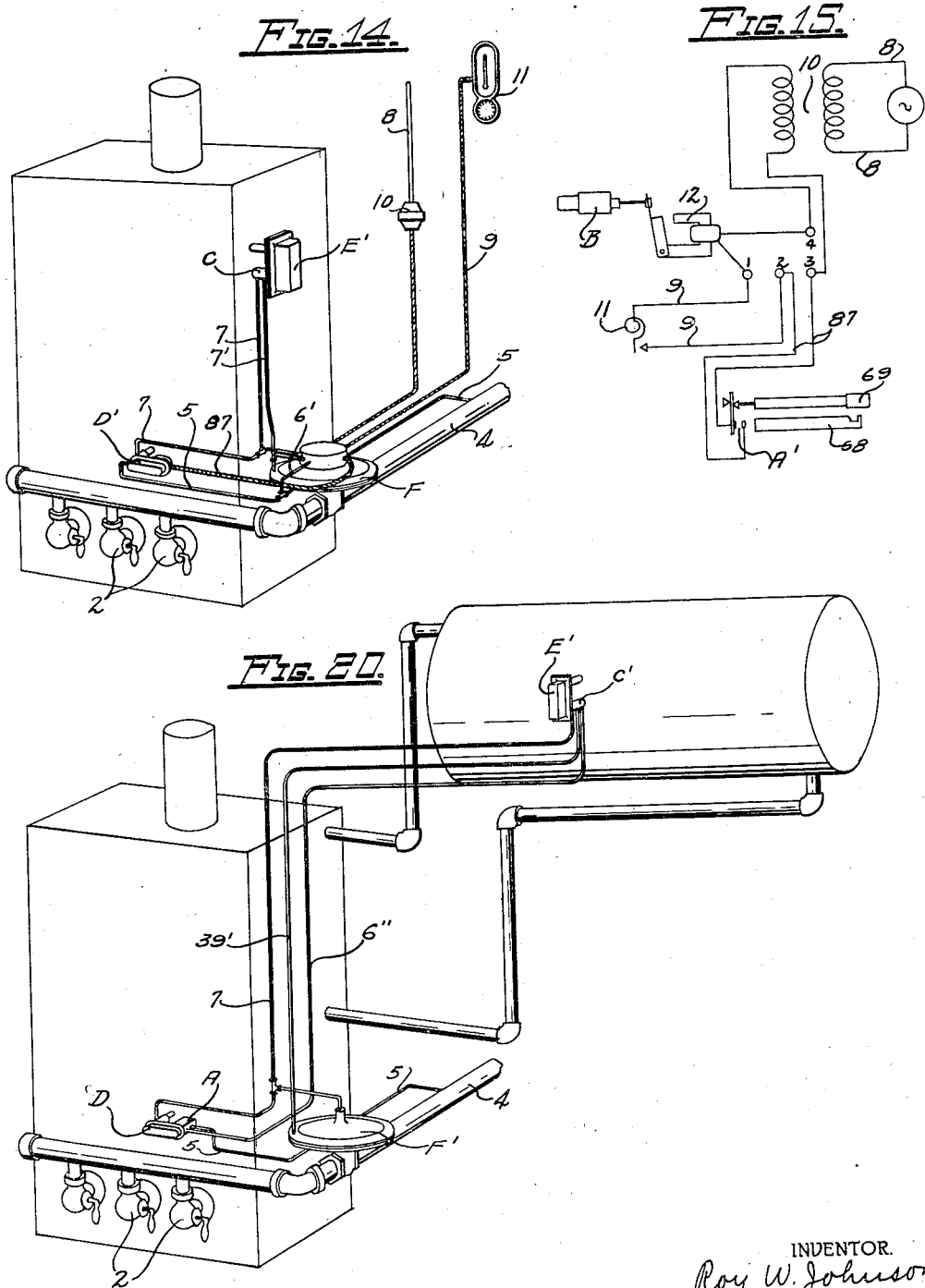

April 12, 1932.  R. W. JOHNSON  1,853,431
AUTOMATIC CONTROL FOR BURNERS
Filed Oct. 10, 1928   10 Sheets-Sheet 6
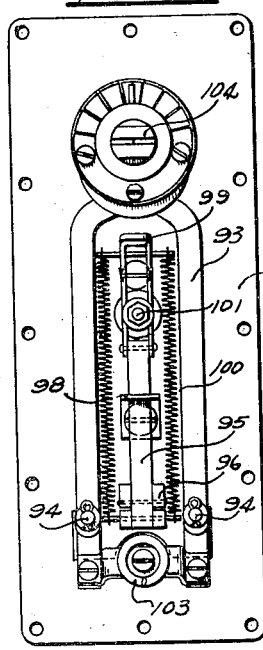
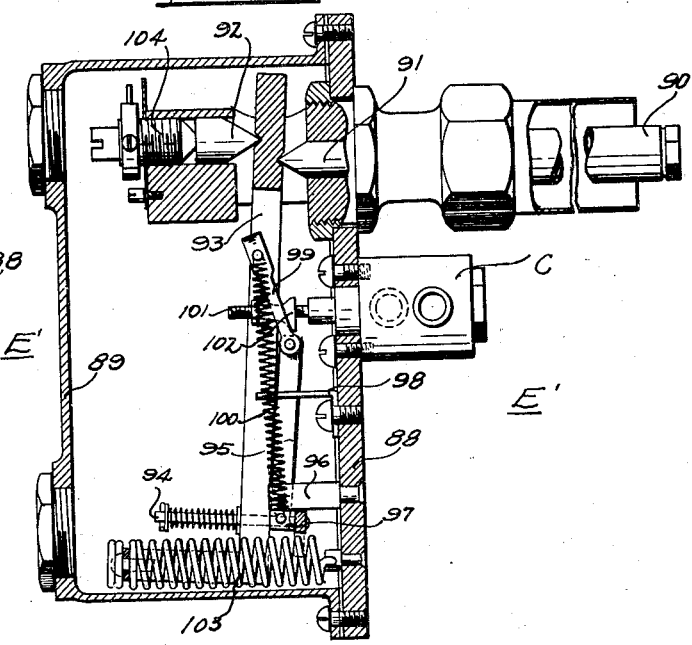
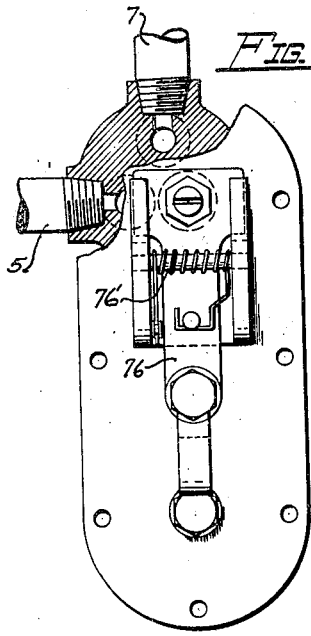
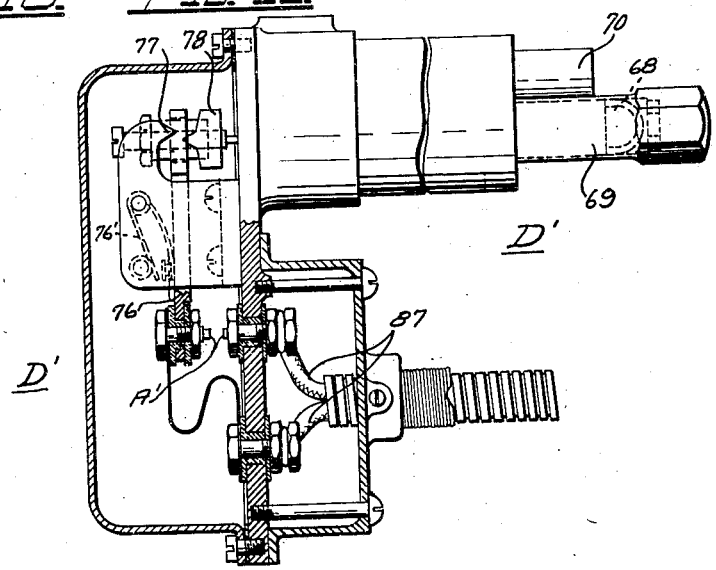
INVENTOR.
Roy W. Johnson
BY Bottum, Hudnall,
Lechner, McNamara & Michael
ATTORNEY.

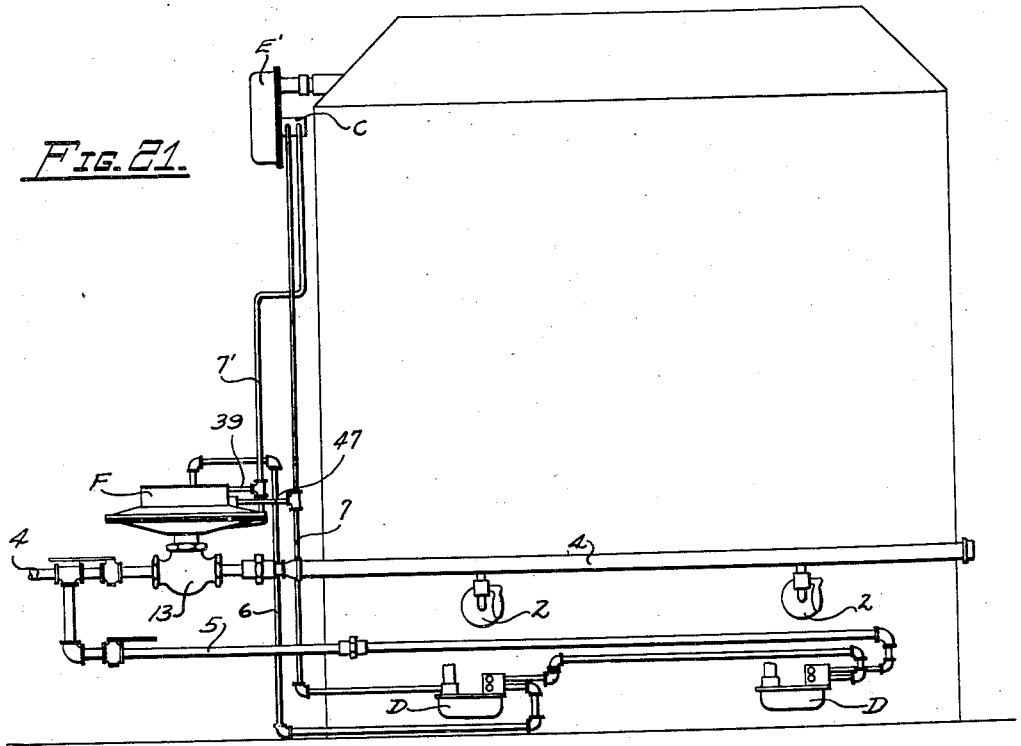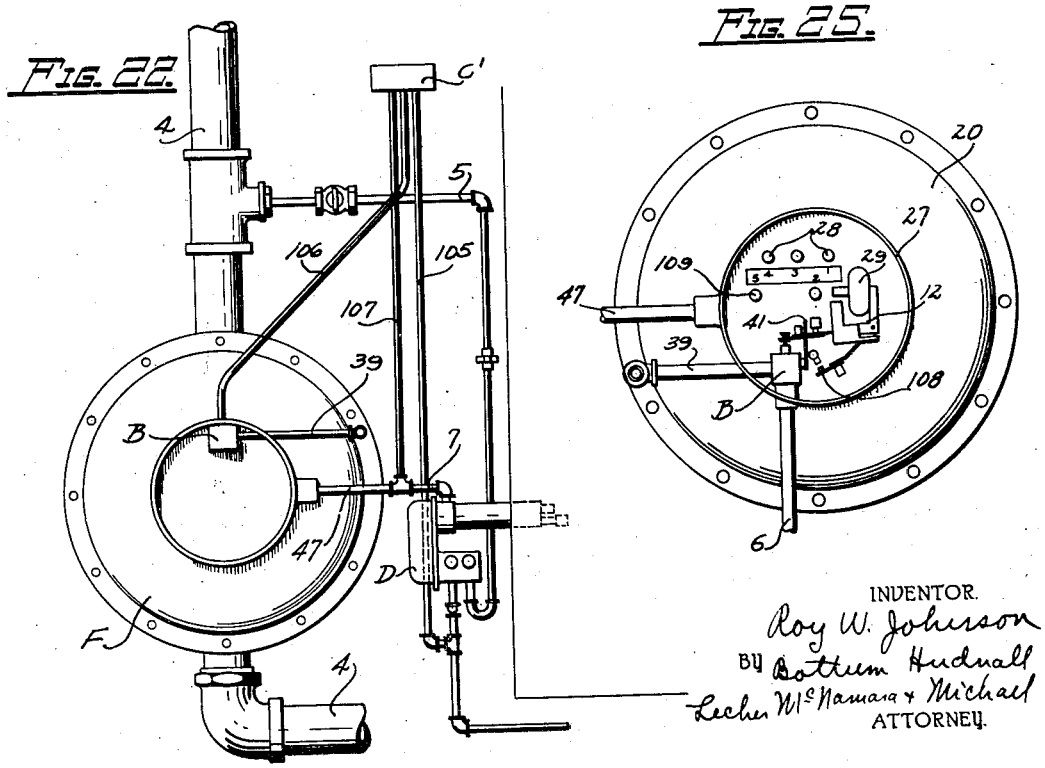

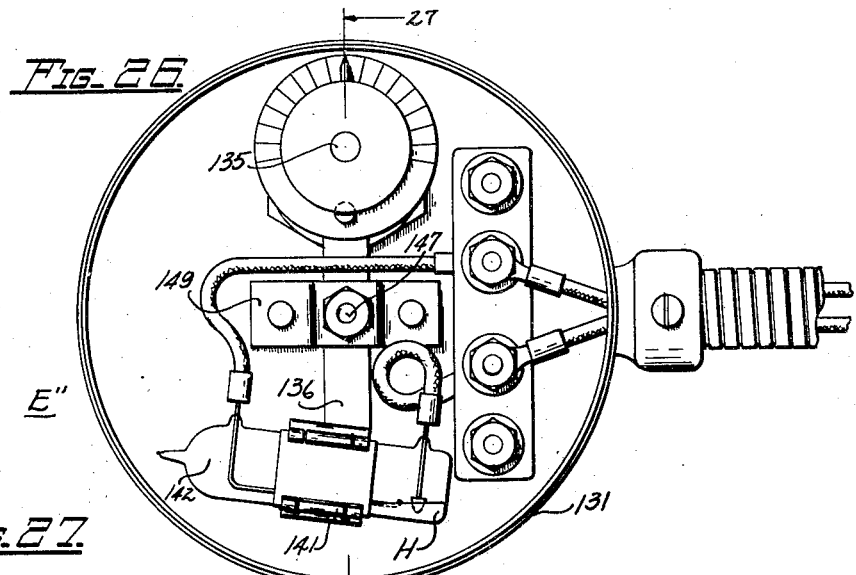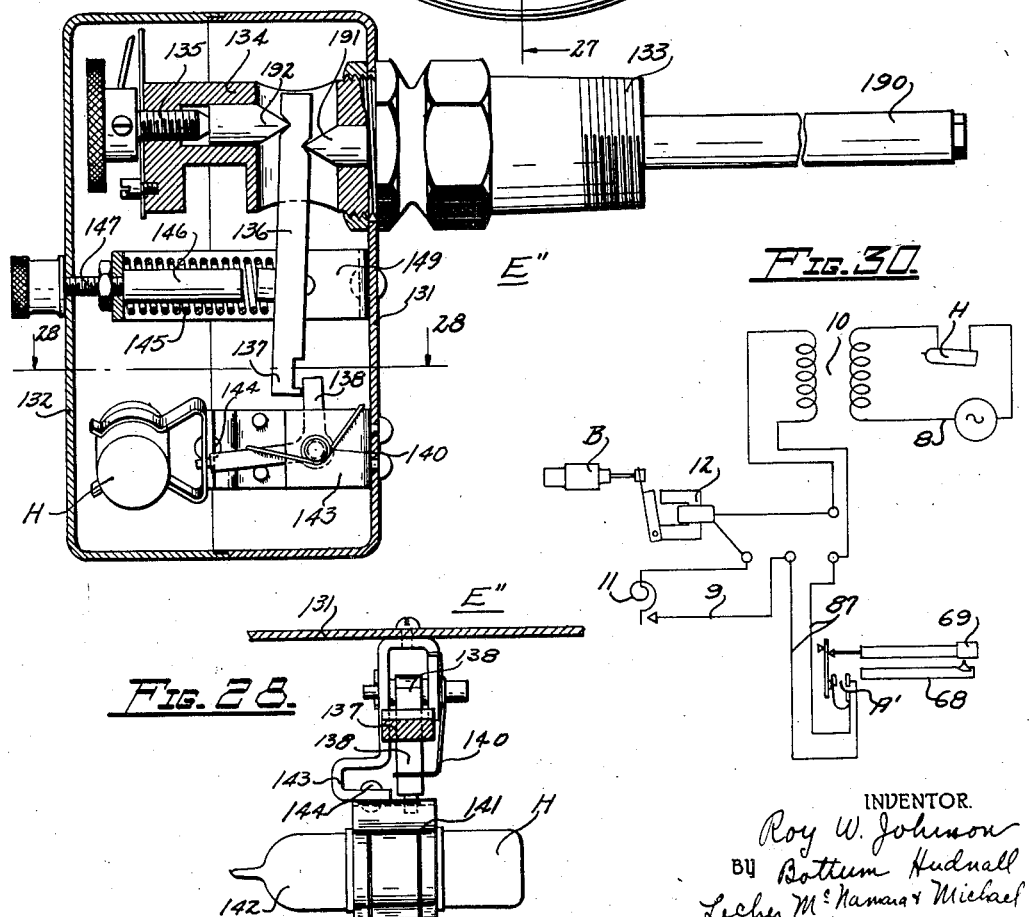

April 12, 1932.    R. W. JOHNSON    1,853,431
AUTOMATIC CONTROL FOR BURNERS
Filed Oct. 10, 1928    10 Sheets-Sheet 10
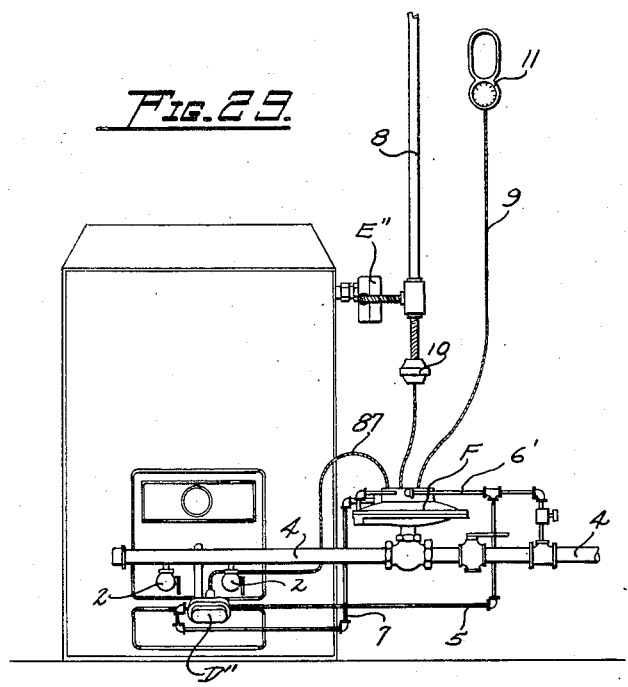
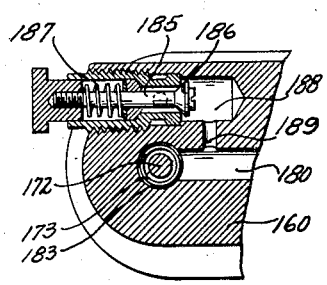
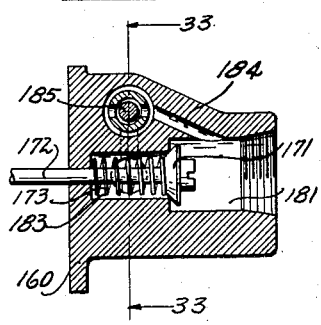
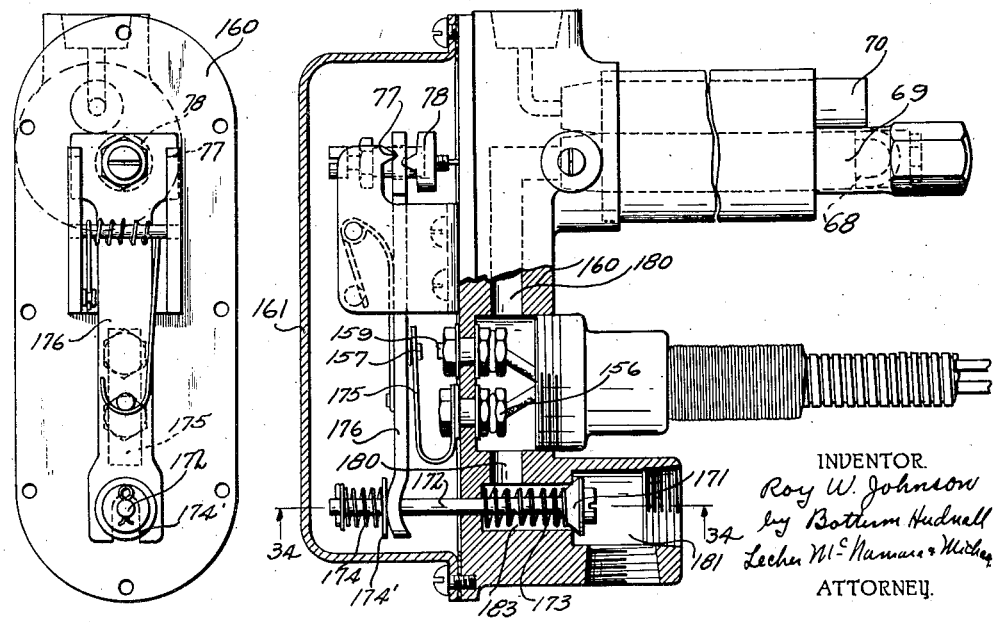
INVENTOR.
Roy W. Johnson
by Bottum Hudnall
Lecher McNamara & Withey
ATTORNEY.

Patented Apr. 12, 1932

1,853,431

UNITED STATES PATENT OFFICE

ROY W. JOHNSON, OF MILWAUKEE, WISCONSIN, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

AUTOMATIC CONTROL FOR BURNERS

Application filed October 10, 1928. Serial No. 311,545.

This invention relates to an automatic control system for gas burners and more particularly to an automatic control system for regulating the flow of gas to a burner or burners used for house heating systems.

Various types of controls for gas burning equipment have been devised heretofore. In general, the control systems of the prior art employ devices such as fusible plugs, expansible elements, or thermostats for controlling the operation of valves in the supply line to a burner to regulate the flow of gas thereto in accordance with the heating conditions of apparatus with which the devices are associated.

The present invention relates to a control system of this type and an object of the invention is to provide a novel system and apparatus which may be used not only with water heaters and hot water storage tanks, but also in connection with furnaces for heating plants such as the steam, vapor, hot air, or hot water types.

A further object is to provide means for controlling the flow of gas to a burner so as to provide a reliable system which operates automatically to prevent injury such as that caused by overheating the apparatus associated with the burner and to prevent the escape of unignited gas into the flues of the boiler or furnace or into the house or room in which the burner is located.

As mentioned above, an advantageous embodiment of the invention is its application to furnaces for heating plants. In such an embodiment it is desirable to use a pilot to control the ignition of the gas supplied to the main burner. An object of the invention is to provide a thermostatic device which acts in accordance with the temperature at a point adjacent the pilot to control the flow of fluid under pressure to a pressure actuated device which device in turn operates valve mechanism to control the flow of gas to the burner. Another important object of this embodiment is the provision of means for causing the pressure actuated device to close the valve and stop the flow of gas to the burner when the pressure therein is reduced to approximately atmospheric pressure. Thus, should the gas supply fail or the pressure become low, the valve will close and remain closed even after the gas is again supplied at the proper pressure, until the pilot is manually re-lighted.

Another feature of the invention resides in means on a boiler or on the bonnet of a hot air furnace for causing the flow of gas to a burner to be cut off in the event that undesirable or dangerous conditions are present in the boiler or furnace.

Another feature of considerable importance is the provision of novel means which is reliable and accurate for controlling the gas pressure on a pressure actuated device so as to regulate the supply of gas to the burner in accordance with the temperature of the air at a distant or remote point from the boiler or furnace.

A big disadvantage in the systems heretofore devised for controlling gas burners resulted from the complicated structures used, which in many cases have required the assemblage of a collection of many different parts requiring considerable time and skill to install. An object of this invention is to make the various operating parts of the system unitary and compact so that they may be assembled and installed by workmen who are not particularly skilled in the gas heating art.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 3 is a top plan view of the fluid pressure motor and means for operating and controlling the same used in the system of Figure 1;

Figure 4 is a side view, mostly in cross section, of the motor of Figure 3 in combination with a valve actuated thereby and steam throttling mechanism, the view showing the details of the diaphragm valve assembly of Figure 1;

Figure 5 is a cross sectional view of a portion of the fluid pressure motor and control valve therefor shown in Figure 3;

Figure 9 is an end view (the cover being removed) and Figure 10 is a side view, partly in cross section, of the unitary pilot and thermostatic valve control unit shown in Figure 1;

Figure 11 is a fragmentary end view of the pilot unit as viewed from the right of Figure 10;

Figure 12 is a cross sectional view of the pilot unit on the line 12—12 of Figure 10;

Figure 13 is a fragmentary cross sectional view of the pilot unit on the line 13—13 of Figure 9;

Figure 14 is a perspective view of a modification of the system of Figure 1 employing an electrical control on the pilot and being adapted for a hot water or hot air heating system;

Figure 15 is a diagram of the electrical connections of Figure 14;

Figure 16 is an end view (the cover being removed) of a temperature responsive mechanism for operating a control valve in response to the temperature in a water boiler or hot air furnace for use in the system of Figure 14;

Figure 17 is a side view, partly in cross section, of the device of Figure 16;

Figure 18 is an end view (the cover being removed) and Figure 19 is a side view, partly in cross section, showing one form of the electrical control and pilot unit used in the system of Figure 14;

Figure 20 is a perspective view of a further modification of Figure 1, showing how certain units of the systems of Figures 1 and 14 may be used in connection with a hot water supply tank and heater;

Figure 21 is a plan view of a modification of the device of Figure 14 showing how two pilot units may be used in connection with a single valve in the main supply line, the pilot units being like that of Figure 1;

Figure 22 is a view of a control system embodying some of the features of the system of Figure 1, but in which a different valve is used in connection with the boiler control unit;

Figure 25 is a plan view of a fluid pressure motor similar to that of Figure 3 showing a modified form of operating and controlling means for the motor;

Figure 26 is an end view (the cover being removed) of a temperature responsive mechanism for operating an electrical switch in response to the temperature in a water boiler or hot air furnace, the device being similar to that of Figure 16;

Figure 27 is a side view, partly in cross section, of the device of Figure 26;

Figure 28 is a side view of a mercury switch shown in Figures 26 and 27 and mechanism for operating the same;

Figure 29 is a perspective view of a further modification of the invention in which electrical apparatus is used for controlling a valve, the system here shown being adapted for a hot air or hot water heating system;

Figure 30 is a diagram of the electrical connections of the system of Figure 29;

Figure 1:
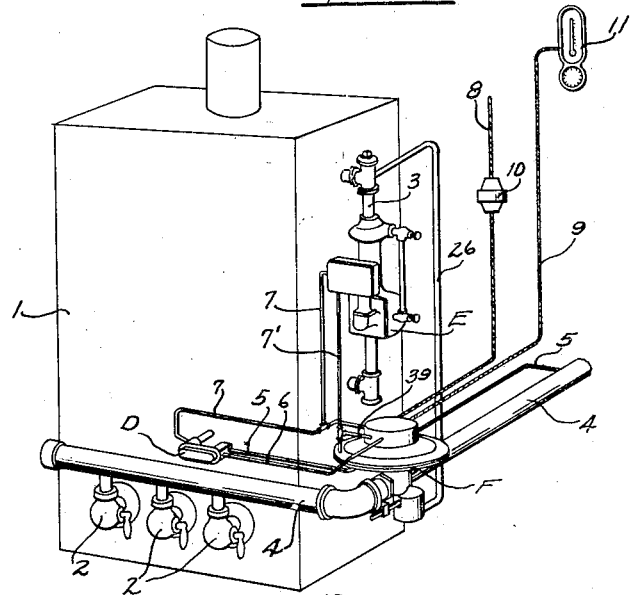
Figure 1 is a perspective view of a preferred embodiment of the invention as applied to a furnace for a steam or vapor heating plant.

Figure 31 is an end view (the cover being removed) and Figure 32 is a side view, partly in cross section of a modified form of pilot unit from that shown in Figures 9 and 10; and Figures 33 and 34 are cross sectional views of the pilot unit of Figures 31 and 32, Figure 34 being taken on the line 34—34 of Figure 32 and Figure 33 being taken on the line 33—33 of Figure 34.

Figures 1 to 13, inclusive, show the preferred form of the invention as applied to a steam or vapor boiler. In order to make the control system compact and in order to aid in the assembly the apparatus used therein, which is situated at the boiler, is arranged in three units D, E and F. The unit D, hereinafter called the pilot unit, is mounted on the furnace 1 adjacent the main burners 2. The unit E, hereinafter called the boiler control unit, is mounted on the side of the furnace as shown and is connected by pipes 3 to a reservoir (not shown) in the furnace. The unit F hereinafter referred to as the fluid pressure motor unit is mounted on the main supply line 4 which conveys gas to the burners 2. These units, in combination with the room thermostat, make up the control system. A small pipe 5 is connected to the main supply line in advance of the fluid pressure motor unit F for conveying gas to the pilot unit and from there through the pipe 6 to a control valve B mounted in a chamber on the upper portion of the unit F. A bleed line 7' conveys gas from the unit F to the boiler control unit E, which operates a valve C therein for controlling the flow of gas from the unit F to the unit D, through the bleed pipes 7' and 7. A source of electric current which may be an ordinary 110 volt alternating current circuit is connected to a transformer 10 by means of wires 8, the transformer 10 reducing the voltage to approximately 20 volts. A thermostat 11 is connected in the secondary circuit of the transformer in series with an electromagnet 12 through the wires 9 for controlling the operation of a valve B mounted in the upper portion of the fluid pressure unit F. The thermostat 11 may be of any known type which operates to open and close the electrical switch at a critical temperature. The thermostat per se forms no part of the present invention.

The units D, E and F will now be described in detail.

Figures 3 to 6, inclusive, show the details of the fluid pressure motor unit. As shown in these figures, the main valve coupling 13 is provided with upper and lower seats 14 and 15 and with upper and lower valves 16 and 17. The upper valve is spring pressed against its seat by a spring 18 and is mechanically connected to a diaphragm 19 mounted in a casing 20 of the motor. The lower valve 17 is of the throttling type and is actuated by an expansible chamber 21 against the gravity action of a weight 22 mounted on a lever 23 which is pivoted as at 24 to the casing 25 of the expansible chamber. Steam is supplied to the expansible chamber through the coupling 26 from the upper portion of the reservoir in the furnace. The system may, of course, be operated without the steam throttle valve 17.

The upper portion of the fluid pressure motor casing 20 carries a chamber 27 in which is situated a three-way valve B, electromagnetic means 12 for actuating the valve B, and binding posts 28 for making the proper electrical connections between the source, electromagnet, and electric control apparatus as explained hereafter. The electromagnetic means consists of a coil 29 adapted to energize a core 30 and move the armature 31 which has an extension 31' connected to the valve stem 32 of the valve B. A small spring mechanism 33 mounted on the casing 20 normally maintains the armature in its open position, thus exerting a downward force on the valve stem as viewed in Figure 3. The extension 31' is somewhat flexible so as to compensate for slight differences in the movement of the armature and the movement of the stem of valve B. The movement of the armature is slightly greater than that of the valve stem so as to insure proper closing of the valve in either position.

Figure 6:
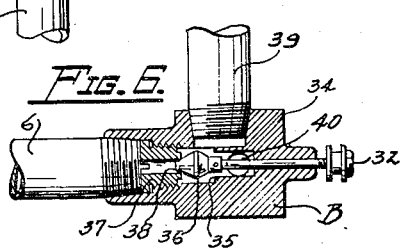
Figure 6 is a cross sectional view of the control valve shown in Figures 3 and 5.

Referring to Figure 6 which shows the valve B in detail, there is shown a metal block 34 having a seat 35 at the right of the valve plunger 36. This block may be of a rectangular solid shape as shown in Figures 3, 5 and 6 or may be of cylindrical shape like the valve C' of Figure 23. The left hand portion of the block 34 is provided with an opening which is screw threaded to receive an insert 37 which carries a second seat 38. A suitable plunger 36 is mounted in the block 34 and adapted to reciprocate back and forth so that the conical faces thereon may cooperate with either of the seats 35 or 38 as shown, when the plunger is in either the right or left hand position of Figure 6. When the plunger is in the left hand position as shown in Figure 6, fluid may flow from the pipe 39 to a port 40 in the block 34, the port 40 being at right angles to the plane of the paper in this figure. A cam 41 is mounted on the side of the valve B to hold the valve stem up as viewed in Figure 3 or to the right as viewed in Figure 6, if it is desired to maintain the valve in that position. As shown in Figure 5, the pipe 39, which leads from the valve B is connected through a T 39' to a bleed pipe 7' and to a pipe 42 which is connected to a passage way 43 in the casing 20 which leads to the lower compartment 44 of the fluid pressure motor. The passage 43 has any suitable means, as the screw 45 for adjustably restricting the passage of fluid therethrough. The port 40 of the valve B leads to the upper compartment 46 of the fluid pressure motor. As shown in Figure 4, the pipe 47 is also connected to the upper compartment 46 of the motor which is connected to the bleed pipe 7' which flows to the pilot unit as shown in Figure 1. Thus, it may be seen that the upper compartment 46 is under atmospheric pressure at all times and has a pipe 47 connected to the bleed 7. Should the diaphragm 19 ever leak as it might after long use, gas would not flow into the room in which the fluid unit is placed but would flow directly to the pilot through the bleed pipe 7.

Figure 7:
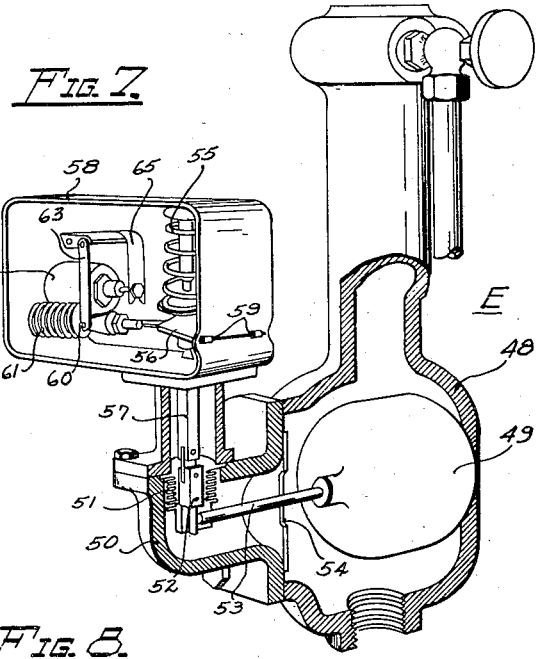
Figure 7 is a perspective view, partly in cross section, of a dual steam pressure regulator and low water cut-off, the view showing the details of the boiler control unit of Figure 1.
Figure 8:
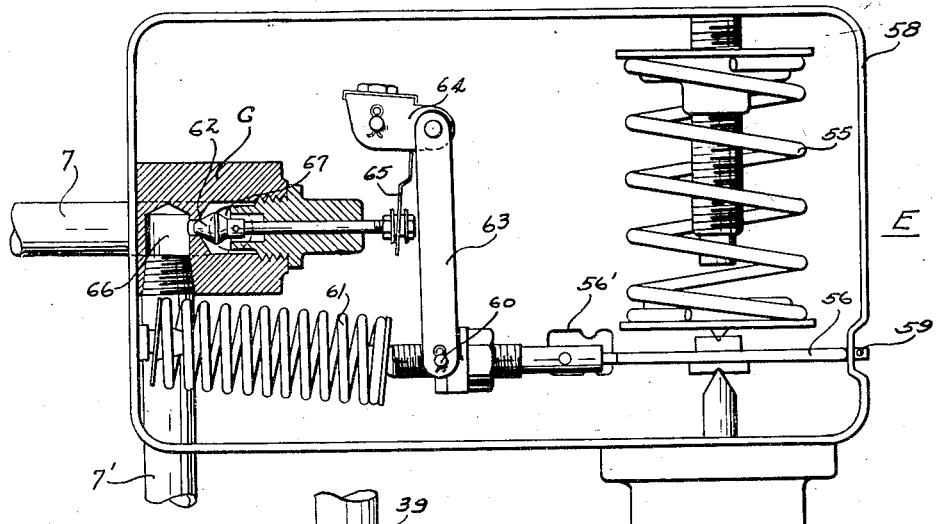
Figure 8 is an enlarged side view of the valve actuating mechanism and a cross sectional view of the control valve shown in Figure 7.

Figures 7 and 8 show the boiler control unit E in detail. This unit includes a casing 48 adapted to be mounted on the boiler at a point approximately opposite the normal water level therein and a float 49 which is raised into the position shown in Figure 7 when the water in the boiler is at the proper operating level. When the water is lowered, the float 49 is permitted to drop to the lower portion on the casing. The casing 48 has a side portion 50 mounted thereon which carries an expansible chamber 51 which is subjected to the steam and water pressure in the casing 48. The expansible chamber 51 carries a block 52 which is adapted to be raised and lowered by the expansion of the chamber or by movement of the rod 53. The rod 53 is connected to the float 49 and may travel up and down for limited movement in the slot 54 which serves as a guide therefor. It will thus be seen that if the water level of the boiler becomes excessively low or if the steam becomes excessively high, upward motion will be imparted to the block 52 which operates through a suitable spring and link mechanism shown in Figure 8 for opening the valve C. A plate 56 is pivoted to the box 58 as shown at 59. The plate has a slight projection on its side for cooperating with a hole 56' in the side of the box so that the angular movement of the plate about its pivot is limited. Upward movement of the block 52 is opposed by the spring 55 which bears against the plate 56, which is moved upwardly through the pressure from the link 57. The free end of the plate carries the pin 60 which carries a link 63. A small spring 61 is utilized to give a snap action to the valve C, the pivot 60 swinging past the dead center in compressing and permitting expansion of the spring 61. Motion is imparted to the valve plunger 62 through suitable links 64 and 65 and the link 63 pivoted on the pin 60. The valve C is a two-way valve having an inlet 66 and an outlet 67 connected to the bleed pipe 7. The valve C is similar to the valve B of Figures 5 and 6, except that it is a two-way instead of a three-way valve. As shown in Figure 8, this small control valve has only one seat for cooperating with the plunger 62 to permit gas to flow or to cut it off between the pipes 7' and 7.

Figures 9 to 13, inclusive show the construction of the pilot unit used in the system of Figure 1. This pilot unit is an important part of the present invention but is not claimed, per se, in this application, but forms the subject matter of a divisional application Serial No. 311,546 filed October 10, 1928.

As shown in Figures 9 to 13 the pilot unit has a base member 72, to which a cover 81 may be secured, for enclosing the movable parts. A tube 68 which may be provided with a Bunsen burner at the base thereof, is mounted on the base and is supplied with gas through a valve thereon, as will appear hereinafter. A thermostatic element 69 and a bleed pipe 70 are mounted adjacent the tube 68 and these three elements are surrounded by a tubing 71. The thermostatic element may consist of a rod or tube having a positive co-efficient of expansion so that it moves to the right upon being heated. The lower portion of the base 72 carries the valve A.

As shown in detail in Figure 13, the valve A has a plunger 73 and a stem 74 which are actuated through a spring and link mechanism by the thermostatic element 69. A spring 75 normally holds the plunger in the right hand position as viewed in Figure 13. In the position shown, the valve plunger 73 closes the passage-way from the pipe 5 to the pipe 6. A bracket is mounted on the base and carries pivot points 77 upon which a lever 76 is mounted. The thermostatic element 69 carries a second pivot 78 on its inner end which bears against the lever 76 just beneath its fulcrum point 77. The lower end of the lever is connected to the valve stem 74 through a spring 74'. A spring 76' is mounted on the bracket and partly opposes the pressure of the thermostatic element on the lever 76. Upon the thermostatic element 69 expanding due to the heat from the combustion of gas at the end of the tube 68, the valve plunger 73 is permitted to be forced to the right by the spring 75, the lower end of the lever 76 moving to the right under these conditions. If the pilot is extinguished, however, the contraction of the thermostatic element 69 pushes its pivot point 78 to the left, moves the lower end of the lever 76 to the left, and hence closes the valve A when the pressure in the spring 74' caused by the movement of the lever overcomes the force in the spring 75. The valve A not only controls the passage of gas from a pipe 5 to the pipe 6 connected thereto as shown but also controls the passage of gas from the pipe 5 to a passage 79 through an adjustable regulating valve 80. The passage 79 leads to the face of the base 72 so that gas may flow to the pilot when the valve A is open, the cover 81 being fastened on the face of the base 72 and being made gas tight by the gasket 82. Gas may therefore, flow from the passage 79 across the face of the base to a passage 83 (see Figure 9) connected with the Bunsen burner in the base of the tube 68. It will be seen that any leakage around the valve stem 74 of the valve A will not permit gas to escape to the atmosphere but such gas will also pass to the Bunsen burner. A primer valve 84 is also mounted on the base 72 and permits gas to flow from the pipe 5 to the passage 79 and hence to the burner when the plunger 85 is manually depressed against the action of the spring 86. In lighting the pilot, the plunger 85 is depressed and the gas escaping from the burner is ignited manually. After an interval of time, the thermostatic element 69 expands, opening the valve A so that the pilot will remain lighted after the valve 84 is closed. The flow to the pilot may then be regulated by adjusting the valve 80. The upper portion of the base 72 is drilled and tapped, as shown at 70', to provide for connecting the bleed pipe 7 to the bleed tube 70 as shown in Figure 9.

Figure 2:
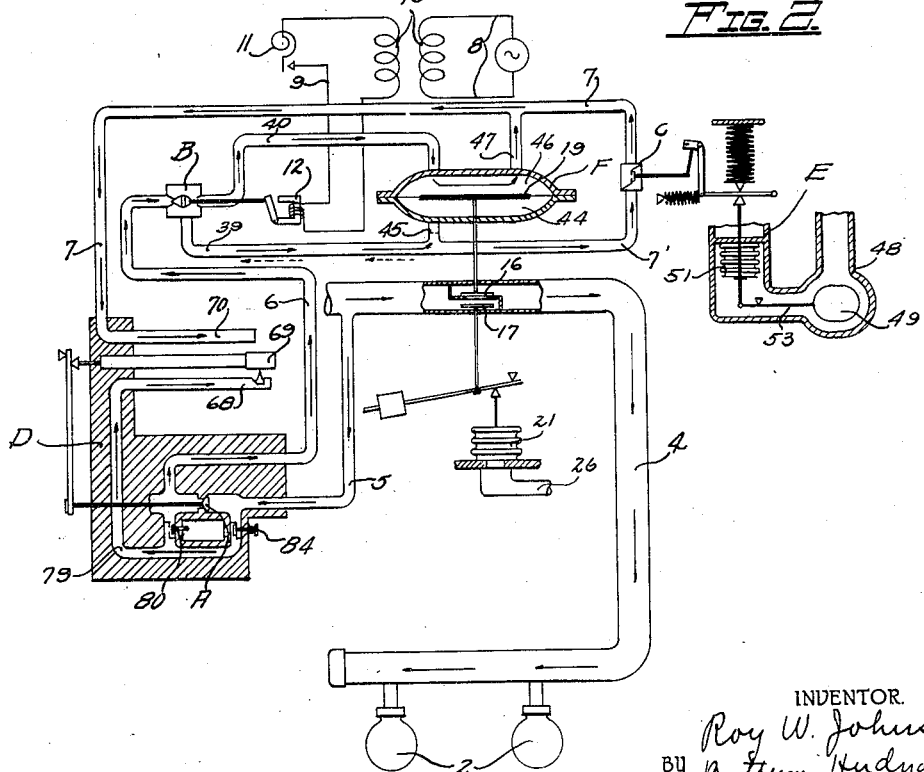
Figure 2 is a diagram showing the path of travel of gas in the system of Figure 1 and roughly showing the operation of the parts thereof.

Referring now to Figure 2 there is a diagram showing the operation of the system of Figure 1 and the path of travel through the various units. Assuming that the valves are in the positions shown, no gas will be supplied to the pilot or the burners. To start the device, the valve 84 is manually depressed, permitting gas to flow through the passage 79 to the pilot tube 68. When the gas is ignited, the thermostat 69 will expand, opening the valve A and permit gas to flow through the restricting valve 80 to the passage 79. Gas will also be permitted to flow through the pipe 6 to the valve B mounted upon the fluid pressure unit F. The temperature of the air which affects the room thermostat 11 being sufficiently low, the thermostat will close the circuit of the electromagnet 12 which will move the valve B from the left to the right hand position opening the passage from the line 6 to the line 39 and through the restriction 45 to the lower compartment 44 of the motor. In this position the opening to the passage 40 will be closed. The pressure of the gas in the lower compartment 44 will raise the diaphragm 19, open the valve 16 and permit gas to flow through the main line 4 to the burners 2 which will be ignited by the pilot. As long as the valve 16 remains open, the throttling valve 17 operates to regulate the flow of gas to the burners in accordance with the pressure in the boiler as explained above. The valve 16 will close, however, whenever pressure in the lower compartment 44 is released. Assuming now that the valve C is closed, the valve B is in the right hand position and the valve A is open and gas is being supplied to the burners. Under these conditions, if the pilot goes out, the valve A will be closed relieving the pressure in the lower compartment 44 of the motor, the gas therein flowing from this compartment back through the lines 39 and 6 and through the restriction 80, passage 79 and pilot tube 68, into the furnace, thus cutting off the supply of the main burner. If, under the above conditions, the pilot remains lighted and the valve A remains open and the room thermostat becomes sufficiently heated to open its electrical switch, the magnet 12 will be de-energized and the plunger of the valve B will move to the left, cutting off the passage from the lines 6 to the line 39 and opening the passage from the line 39 to the port 40, through which gas will flow from the lower compartment 44, through the upper compartment 46 of the motor, to the pipe 47 and the bleed line 7, thus closing the valve 16.

If, under the above conditions, the pilot remains lighted, the room thermostat remains closed, or if these controls fail to operate, as, for instance, if the wires 9 become short circuited so as to maintain the electromagnetic circuit closed irrespective of the operation of the room theremostat, the boiler control unit will operate, ultimately, because of the increase in steam pressure or decrease in water level in the boiler. This unit operates to open the valve C so as to relieve the pressure in the lower compartment 44. The path of travel of the gas is then through the valve B as before, to the pipe 39, but the opening to the motor at 45 being smaller than that through the valve C, the gas will flow through the pipe 7', valve C to the bleed pipe 7 to be burned up at the pilot.

In making the electrical connections in this embodiment of the invention, the post number 3 of the binding posts 28 (see Figure 3) is not used. The room thermostat is connected to the posts 1 and 2 and the secondary of the transformer 10 to the posts 2 and 4. The coil 29 is connected to the posts 1 and 4 so that it is in series with the source and room thermostat as shown in Figure 2.

Figures 14 to 19, inclusive, show a modified form of the control system of Figures 1 to 13, inclusive, which is adapted for use in a hot water heating system and in which an electrical pilot unit is used. It will be obvious from what is to follow that a hot water heating system need not involve both of these changes and that the electric pilot unit may be used in the system of Figure 1. The same reference numerals designate the same parts used throughout the various modifications.

As shown in Figure 14, the assembly for a hot water system is similar to that of Figure 1 except that electric wires 87 run to the pilot unit D' instead of pipe 6 to the pilot D in Figure 1, and temperature limit control E' is used in place of the boiler control unit E. The control valves B and C of units F and E' operate exactly the same as they do in the system of Figure 1. The difference between this system and that of Figure 1 resides in the means used to control the valves B and C and in the use of an electric switch A' instead of the valve A for the pilot control of the first described system.

Figures 18 and 19 show the construction of the pilot unit D' which is used in the system of Figure 14. As will be seen, this unit is very similar to the unit D of Figures 9 and 10, and operates in the same way except that the lever arm 76 pivoted at the point 77 controls an electric switch A' instead of a valve. It is obvious that any suitable electric switch may be used, the one shown comprising suitable posts mounted on insulating bushings as shown. When the thermostatic element 69 becomes heated, due to the ignition of gas at the pilot burner, its expansion moves its contact point 78 to the right (Figure 19) to permit the lever arm 76 to be moved to the right by action of the spring 76' and close the circuit of the two wires 87. The function and operation of this switch will be evident from an inspection of Figure 15. As there shown, the pilot switch A' is connected in series with the room thermostat switch 11 by the wires 9 and 87 so as to cause the electromagnet 12 to be energized by the current from the transformer 10 only when both switches are closed. This connection is effected by using binding post number 3 of the binding posts 28, as well as posts 1, 2 and 4. When the electromagnet 12 is energized, it actuates the plunger of the valve B to control the pressure in the fluid pressure motor F exactly as in the system of Figure 2.

The temperature limit control unit E' used in this modification is shown in detail in Figures 16 and 17. This unit consists of a base or frame member 88 to which a cover 89 may be secured and which carries a thermostatic expansion element 90 similar to but preferably somewhat larger than the thermostatic element 69 of the pilot. The inner end 91 of the thermostatic element makes contact with the lever 93 which is pivoted as shown at 92, the pivot point being adjustable by a screw 104 so that the position of the lower end of the lever 93 may be varied. The lower end of the lever 93 is adapted to move back and forth upon a pin 94 fastened to a toggle link 95 which is pivoted on a post 96 secured to the base. The toggle link 95 has a projection 97 with which the lever 93 is adapted to make contact when the thermostatic element 90 becomes heated. When this action takes place, the projection 97 is moved slightly to the right causing the upper end of the toggle link 95 to be moved to the left and the valve stem 101 moved to the right through the action of a second toggle link 99, coil spring 100 and adjustable coupling 102. The pressure caused upon the inner end 91 by the thermostatic element 90 is partly counterbalanced by the tension spring 103 secured to the lower end of the lever 93 and secured to the base 88. The screw 104 may be adjusted to cause the action of the toggle to open the valve at any desired temperature with a snap action. The opening of the valve C permits gas to be bled from the lower compartment of the fluid motor F similar to the action in the system of Figures 1 and 2, as will be well understood.

Figure 20 shows a third modification in which some of the above elements are utilized in a hot water storage system. In this figure, the pilot unit D is the same as that shown in Figure 1. It is connected to the supply line 4 through a pipe 5 in the same way. The temperature limit control E' is the same as that shown in Figure 14 except that a three-way valve C' is used instead of two-way valve C. The fluid pressure motor unit F' differs from the unit F in that there is no control valve or electromagnet mounted thereon, there being no necessity for a room thermostatic control in this system. A unit F may, of course, be used in this system if the cam 41 is moved to hold the valve B open. The valve C' is connected to units D and F' exactly the same as the valve B is connected in Figure 2, pipes being used to convey the gas to and from these units instead of mounting the valve directly upon the fluid pressure motor. The valve C' which is of the same construction as the valve B permits gas to flow to the lower compartment of the motor F'. When the water in the storage tank is below the required temperature, the pilot being lit, the path of travel of the gas to the lower compartment of the motor is through the pipe 5, valve A, the pilot pipe 6'', valve C' and pipe 39'. Upon the desired temperature being reached in the storage tank, the valve C' operates to relieve the pressure in the lower compartment of the motor, the path of travel of the gas then being through the pipe 39', valve C' and bleed pipe 7 to the pilot unit D.

Figure 21 shows a fourth modification in which two pilot units D are used, one for each burner 2. The operation of the system is the same as that of Figure 1 except that the two pilots D are in series so that if either one is extinguished, gas in the pipe 6 will be cut off to cause the main valve 13 to close. The bleed 7 need extend to only one pilot as shown in this figure. A temperature limit control E' is also shown in place of the boiler control unit E of Figure 1. It is obvious, however, that the units E and E' are interchangeable, one being adapted for steam or vapor systems while the other is for use in hot water or hot air heating systems. The operation of the valves B and C are like that of Figure 1. No electrical connections are shown in this figure, but the unit F may be supplied with a thermostat if desired or the valve B may be held open by the cam 41 (see Figure 3) so as to cause the fluid pressure motor to operate, in effect, like the fluid pressure motor F' of Figure 20.

Figure 23:
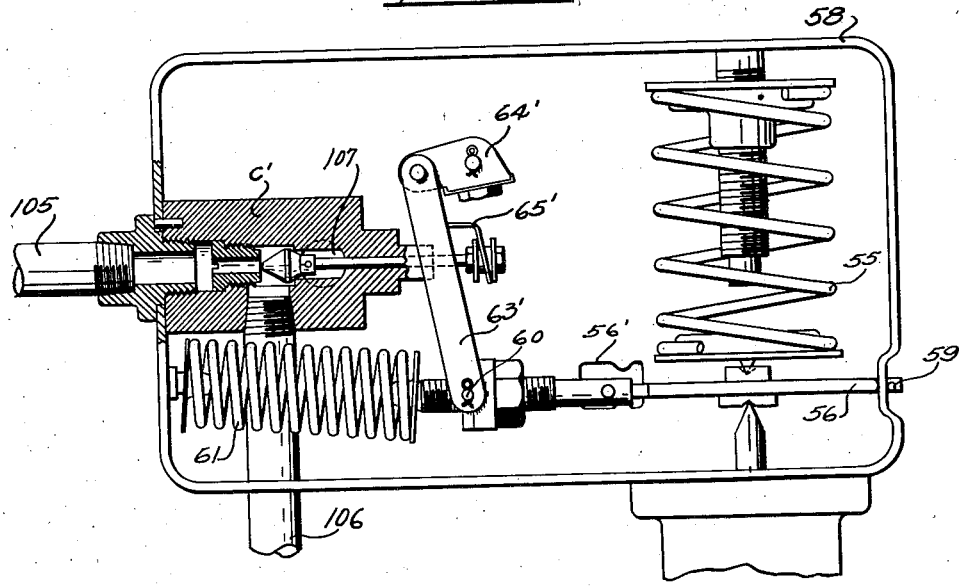
Figure 23 is a plan view of one form of mechanism for operating a control valve shown in cross section, the mechanism being adapted for use in the system of Figure 22.
Figure 24:
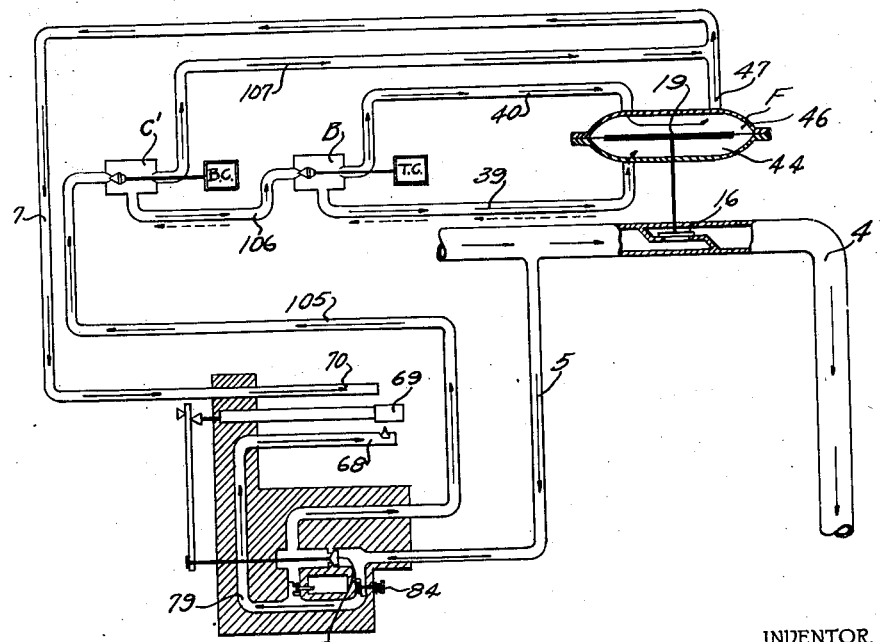
Figure 24 is a diagram showing the path of travel and operation of the elements of the control system of Figure 22.

A fifth modification of the invention is shown in Figures 22 to 24, inclusive. As seen in Figure 22, a pilot unit D and fluid pressure motor unit F' like those of Figure 1 are used, but a three-way valve C' which is of a construction like that of the valve B is used on the furnace to control the operation of the motor in response to conditions in a boiler, hot water tank or passages of a hot air heating system. Means for operating the valve C' have not been shown, it being obvious from the disclosure of the above apparatus that the valve may be controlled by either a boiler control unit E or a temperature limit control E'. Figure 23 shows mechanism comprising springs and levers for operating such a valve C' by the use of a boiler control unit E. The valve C' has three pipes connected thereto as shown at 105, 106 and 107. When the plunger is in the position shown, gas is permitted to flow from the pipe 106 to the pipe 105. The operation of the links and springs is similar to that of Figure 8 except that the valve plunger is moved from the right to the left upon undesirable conditions presenting themselves in the boiler, whereas in Figure 8, the plunger was moved from left to right under these conditions. This is accomplished by pivoting the link 63' to the link 64' at the left of its pivot point instead of at the right so as to cause the spring 65' to convey the desired motion to the valve plunger.

The operation of the device of the system of Figure 22 is shown diagrammatically in Figure 24. As shown, the valve C' is not directly connected to a bleed line from the lower compartment of the motor F (as in Figure 2) but is situated between the pilot unit and the valve B. The operation of the system is as follows:—Assuming that the valves are in the position shown, gas will flow through the pipe 5 to the pilot unit as in the system shown at Figure 2. Upon the pilot heating the thermostatic element 69, the valve A will be opened permitting gas to flow through the pipe 105 to the valve C'. If the conditions in the boiler are all right, the boiler control B. C. will cause the plunger of the valve C' to move to the right permitting gas to flow through the pipe 106 to the valve B. The conditions being right, for causing the thermostatic control (T. C.) to move the plunger of the valve B to the right, gas will be permitted to flow to the lower compartment of the motor F. When the room becomes heated sufficiently the thermostatic control will cause the plunger of the valve B to be moved into the position shown permitting gas to flow to the upper compartment of the motor and to be bled to the pilot as in the system of Figure 2. If the plunger of the valve B remains to the right, however, and undesirable conditions occur in the boiler, the plunger of the valve C' will be moved to the left, permitting the release of the pressure in the lower compartment of the motor back through the pipes 39 and 106 and out through the pipe 107 to the bleed 7. The pilot control operates the same as that of Figure 2. The system may or may not be provided with a steam throttle valve like that shown at 17 of Figures 1 and 2.

Figure 25 shows a slightly different form of electromagnetic system for controlling the operation of the valve B. With some kinds of room thermostats, three wires are used for the control of an electromagnet for operating the valve. Such thermostats are well known and need not be further described here. With such thermostats, it is necessary to have a switch for the holding circuit of the electromagnet. Such a switch which may be of any suitable construction is shown at 108. An additional binding post 109 is also provided for use with this switch. Otherwise the unit of Figure 25 is the same as that of Figure 3.

Referring now to Figures 26 to 34 and particularly to Figure 29, a sixth modification of the invention is shown. This modification may be used with either a hot air or a hot water heating system, the one shown being of the type having a hot air furnace.

This form of the invention of Figure 29 is very much like that of Figure 14 and the same reference numerals indicate like parts in the two figures. The only difference in the control system resides in the use of an electric temperature limit control unit E'' instead of a mechanical limit control unit E' of Figure 14, and in the use of a different pilot unit.

The limit control unit E'' is mounted on the side of the furnace and has a thermostatic expansible element, which extends into the air passages or bonnet of the hot air furnace, as shown in Figure 29. An electric switch H is carried by the unit E'' and is electrically connected in series with the primary of the transformer 10 as best seen in Figure 30.

The pilot unit D'' disclosed in this modification may be used interchangeably with the unit D' of Figure 14. In addition to the function of operating an electric switch the unit D'' also operates a valve to control the flow of gas to the pilot burner.

The temperature limit control unit E'' and the pilot unit D'' will now be described in detail.

Referring now to Figures 26, 27 and 28, there is shown a limit control unit E''. This unit may consist of a casing 131 and cover 132 adapted to enclose a mercury switch H and apparatus for actuating the same. The unit may be secured upon the side of a boiler or furnace by the screw threaded nipple 133 secured thereto, as shown. The thermostatic expansion element 190, similar to the element 69 on the pilot unit, is secured to the casing and extends out through the nipple so as to be effected by the temperature of water or air in the boiler or furnace. The expansion element has a pivot point 191 at its inner end adapted to be moved to the right as viewed in Figure 27 upon the expansion of the element 190. A second pivot point 192 is adjustably mounted by means of a screw 135 upon a bracket 134 secured to the casing. Pivotally mounted upon the pivot point 192 is a lever 136 which has a portion in contact with the pivot 191 so that the lower end 137 of the lever moves to the right, as viewed in Figure 27, upon the thermostatic element expanding. The lower end of the lever makes contact with the upper end of a crank or angular lever 138 pivoted to a bracket 143, as shown. A small coil spring 140 tends to hold the crank in the position shown in Figure 27. The mercury switch H which may be of any normal construction (the one shown being of the type having a glass tube 42 enclosing two electrodes) is mounted in a clamp 141 pivoted to the bracket 143 by a pin 144 and is adapted to be tilted by an arm of the crank 138.

A spring 145 is mounted on a bracket 149 secured to the casing and is adapted to urge the lever 136 in an opposite direction to that caused by the construction of the thermostatic element 190. This bracket 149 also carries a contact 146 which is adjustably mounted thereon by means of the screw 147, the contact 146 limiting the amount of motion of the lever 136. Thus, when the thermostatic element 190 expands due to the temperature in the boiler or furnace becoming higher than that for which the screw 135 is set the lower end of the lever 136 will be moved to the right to cause the crank 138 to move the switch to open the circuit.

It will be noted from this description that the operation of this device is opposite to that of the electrical pilot unit. In this device an electrical circuit is broken by the switch H when the thermostatic element 190 expands due to the heat of its surrounding medium. Whereas, in the pilot an electrical circuit is made by the switch A' and the thermostatic element expands.

Figures 31 to 34 show a pilot unit in which certain features of the gas pilot of Figures 9 to 13 and of the electric pilot of Figures 18 and 19 are combined. The structure of this pilot unit is very much like that of Figures 18 and 19. It is sometimes desirable to not only break an electrical circuit if the pilot flame becomes extinguished but also to cut the supply of gas to the pilot burner. The pilot unit of Figures 31 to 34 has an arrangement for doing this. The movable lever 176 which is actuated by a thermostatic expansion element 69 through the pivot points 77 and 78, as in the other pilot unit, actuates a valve 171 at the lower portion of the base 160 as well as in the electric switch. A passage-way 180 is provided in the base 160 for conveying gas from this valve to the pilot burner. The valve 171 has a stem 172 which has a spring 174 secured to its end for exerting a pressure to the right against a washer 174'. The stem 172 has a shoulder against which the washer is pressed when the lever 176 moves to the right sufficiently. When, however, the lever 176 moves to the left it lifts the washer off of the shoulder so as to cause the coil spring 174 to exert a force to the left upon the stem 172. A second coil spring 173 is mounted in the base 160 so as to bear against the valve 171, as shown, and move it to the right when the lever 176 moves to the right to permit the spring 174 to expand until the washer reaches the shoulder. Thus, when the thermostatic element 69 becomes heated the lever 176 permits the spring 173 to open the valve 171 but closes it should the pilot become extinguished and the thermostatic element cooled.

Gas must be supplied to the pilot for starting, however, and a path of travel in parallel with the path from the chamber 181 to the chamber 183 and passage-way 180 is provided. This is accomplished through a manually depressible valve 186 in a chamber 188 connected by a passage 189 to the chamber 180. Gas is supplied to the valve through a valve passageway 184 from the main chamber 181 so that when the valve stem 185 is manually depressed against the pressure of the spring 187 gas may flow to the pilot. When starting the valve 186 is depressed and the gas supplied to the pilot burner ignited. After a short interval of time the thermostatic element will expand and permit the valve 171 to be opened so that the gas may flow directly to the pilot burner from the chamber 181 through the chamber 183 and passage-way 180.

The switch construction in this modification is slightly different from that of Figures 18 and 19 but operates the same. A spring 175 forms the electrical connection between a lower binding post 156 and the movable contact 157 and normally maintains the contacts 157 and 159 apart. The contact 157 is not mounted on the lever 176 but is moved thereby through a small insulating button on the lever 176 as shown.

The operation of this system will be clear from an inspection of Figures 29 and 30. As shown in Figure 30, the electrical connections in this modification are the same as those of Figure 15 except for the switch H. This switch constitutes another means for the regulating of the control valve B. The switch H need not be in the primary circuit of the transformer, and in fact, no transformer need be used at all if the apparatus is designed to operate upon a different voltage or if only direct current is available. In the latter case resistances may, of course, be used to reduce the voltage, if desired.

As shown in Figure 29, the bleed pipe 7 leads directly from the fluid pressure motor unit F to the pilot without the interposition of or relation to any other control valve, the valve B being the only control valve used in this system. This valve operates just as it does in the other arrangements however, and it is believed that the operation of the system will now be clear from the disclosure of the other systems.

It is, of course, obvious that only a few of the systems in which the above apparatus may be used have been shown and described in this specification. It is also obvious that many changes may be made in the details of construction of the various parts and that many of the units and valves are interchangeable and may be combined in various ways to meet the requirements of any particular type of heating system or for controlling or regulating in connection with any fluid burning system. It is, therefore, to be understood that many changes may be made without departing from the spirit of the invention and that the invention is not to be limited in any way to the disclosure herein except as limited by the following claims.

I claim:

1. Apparatus for controlling the flow of gas to a burner comprising a valve, a fluid pressure motor having a movable diaphragm for actuating the valve, said diaphragm dividing the motor into upper and lower compartments, a control valve, a line for conveying gas from the control valve to the lower compartment, a second line for conveying gas from the control valve to the upper compartment, means for connecting the control valve to a supply line, and means whereby the upper compartment may be bled to the atmosphere without passing through the control valve.

2. The apparatus claimed in claim 1 and means for moving said control valve so that the path of the gas is from the supply line to the lower compartment in one position of the valve and from the lower compartment to the upper compartment in another position of the valve.

3. In a regulating device for a gas burner, the combination of the gas operated means connected to the supply line of the burner for controlling the flow of gas thereto, said device having a movable actuating element adapted to receive gas on both sides of the same, a plural-way valve for permitting gas under pressure to flow to one side of said element in one position of the valve for moving the element in a direction to open the gas supply to the burner and for permitting gas to be bled from both sides of the element in another position of the valve to permit movement of the element in the opposite direction to shut off the gas supply to the burner.

4. In a regulating device for a gas burner, the combination of the gas operated means connected to the supply line of the burner for controlling the flow of gas thereto, said means having a movable actuating element adapted to receive gas on both sides of the same, a plural-way valve for permitting gas under pressure to flow to one side of said element in one position of the valve for moving the element in a direction to open the gas supply to the burner and for permitting gas to be bled from both sides of the element in another position of the valve to permit movement of the element in the opposite direction to shut off the gas supply to the burner, and means for automatically operating said valve in response to predetermined conditions.

5. In a regulating device for a gas burner, the combination of gas operated means connected to the supply line of the burner for controlling the flow of gas thereto, said means having a movable actuating element adapted to receive the gas on both sides of the same and a device for closing a path of travel so as to permit gas under pressure to flow to one side of said element under certain predetermined conditions and for closing a path of travel so as to permit gas to be bled from both sides of the element under other predetermined conditions.

6. The combination claimed in claim 5 and means for automatically operating said device in response to said conditions.

7. In a heat regulating system, a main gas burner for heating a fluid, means controlling the flow of gas to the main burner, a pressure actuated device for operating said controlling means, a pilot for the main burner and means adapted upon the extinguishment of the pilot light to cut off the supply of gas to the pilot and to relieve the pressure in said pressure actuated device to operate the controlling means to cut off the gas to the main burner.

8. In a heat regulating system having a main burner for heating a fluid, the combination of a valve for regulating the flow of gas to the main burner, a gas pressure motor for operating the valve, said motor including an element mechanically connected to the valve and adapted to receive the gas on both sides of the same and to close the valve when the pressures on both sides of the element are substantially equal and to open the valve when there is a difference in pressure on the two sides of the element, means for maintaining the gas pressure substantially equal to the atmospheric pressure upon one side of the element and means for varying the gas pressure on the other side of the element.

9. In a water heating plant of the type having a boiler, a main gas burner for heating water therein and a supply line for supplying gas to the main burner, the combination of means operated by gas pressure for controlling the supply of gas to the main burner through the line, a thermostat subject to the heat of a remote atmosphere for automatically controlling the flow of gas to said means, a pilot for the main burner, a thermostatic element associated with the pilot for also automatically controlling the flow of gas to said means, and a device associated with the boiler for automatically controlling the flow of gas from said gas operated means in response to undesirable conditions in the boiler.

10. In a heating plant of the type having a main gas burner for heating a fluid, and a main line for supplying gas to the main burner, the combination of a main valve in the main line, a fluid pressure motor for operating the main valve, a supply line for the motor, a bleed line for the motor, valves in said supply line and bleed line for controlling the pressure of the fluid in the motor and means for actuating said valves in response to different predetermined conditions, one of the supply line valves controlling the flow of gas into and out of the fluid pressure motor.

11. In a heating plant of the class described, a main gas burner for heating a fluid, a pilot for the burner, a main gas line for the burner, a main valve in said main line, a gas pressure motor for shutting said main valve when gas supplied to the motor is cut off, a supply line for the pilot and the gas pressure motor, a control valve in said supply line for regulating the supply of gas to the pilot and the motor and means for actuating said control valve in response to conditions at the pilot whereby the gas supplied to the pilot and the motor is cut off if the pilot is extinguished.

12. In a water heating plant of the type having a boiler, a main gas burner for heating water therein and a supply line for supplying gas to the main burner, the combination of a main valve in the main supply line, a fluid pressure motor for operating the main valve, a control valve in the fluid supply line to the motor for regulating the fluid supplied thereto, means acting in response to conditions exterior of the boiler for actuating said control valve, a bleed line for conveying fluid away from the motor, a valve in the bleed line and means for actuating the valve in the bleed line in accordance with conditions in the boiler.

13. In a heating plant of the type having a boiler, a main burner for heating water in the same, a pilot for the burner and a supply line for supplying gas to the main burner, the combination of means operated by gas pressure for controlling the supply of gas to the main burner through the line, three valves for controlling the gas pressure at said means to automatically actuate the same, apparatus for actuating one of said valves in response to the conditions at the pilot, apparatus for actuating the second of said valves in response to the temperature of an atmosphere for controlling the flow of gas to and from said gas pressure operated means and apparatus for actuating the third of said valves in response to the conditions in the boiler.

14. In a heating plant of the type having a main gas burner for heating a fluid, a pilot for the burner and a supply line for supplying gas to the main burner, the combination of means operated by gas pressure for controlling the supply of gas to the main burner through the line, two valves in series connection between a gas supply and said means, apparatus for actuating one valve in response to conditions at the pilot and apparatus for actuating the other in response to the temperature of an atmosphere.

15. In a heating plant of the type having a main gas burner for heating a fluid, a pilot for the burner and a supply line for supplying gas to the main burner, the combination of means operated by gas pressure for controlling the supply of gas to the main burner through the line, two valves in series connection between a gas supply and said means, apparatus for actuating one valve in response to conditions at the pilot and apparatus for actuating the other in response to the temperature of an atmosphere, the valve actuated in response to conditions at the pilot being situated in advance of the valve actuated in response to the temperature so as to control the gas supplied to the latter.

16. A device for controlling the flow of gas to a burner including a valve chamber having two seats therein, a valve for each seat, a gas pressure motor for actuating one valve, an expansion chamber for actuating the other, means for conveying gas to the gas pressure motor and means conveying steam to the expansion chamber, the steam actuated valve serving to throttle the flow of gas to the burner and functions only when the motor actuated valve is open.

17. A steam heating plant of the class described comprising a boiler, a gas burner for heating water therein, a pilot for the burner, a main supply line for conveying gas to the burner, valves in said main supply line, a gas pressure motor for operating one of said valves, an expansion chamber for operating the other of said valves in response to steam pressure in the boiler, a control line for conveying gas to the pilot and to the gas pressure motor, a control valve in said control line, means for actuating said control valve in response to conditions at the pilot, a second control valve in the portion of the control line which is connected to the motor, means for actuating the second control valve in response to conditions in the air to be heated by the heating plant, a bleed line from the motor to a point adjacent the pilot, a valve in the bleed line and means for operating said last named valve in response to conditions in the boiler.

18. Apparatus for controlling the flow of fluid fuel to a burner including a fluid pressure motor having a casing divided into upper and lower compartments by a diaphragm, means for conveying fluid to and from the lower compartment and to the upper compartment, a control valve associated with said means and with a fluid pressure supply line for controlling the operation of the fluid pressure motor, mechanism for actuating the control valve and a cam mounted on the valve and adapted to cooperate with said mechanism to lock the valve in a given position.

19. In combination, a burner, a conduit for supplying fuel thereto under pressure, a main valve associated with said conduit for controlling the flow of fuel to the burner, a fluid pressure motor having a movable element therein connected with the main valve for opening the same in response to the pressure of the fuel in said conduit, a casing associated with the conduit and the motor and having three ports therein, a valve member in said casing and cooperable with two of said ports, three pipes, one connecting one of the valve controlled ports with the supply conduit in advance of the main valve, and the other two pipes respectively connecting the other ports with the motor on opposite sides of the movable element thereof, a vent for the motor on the side of the element opposite that which is subjected to pressure to open the valve, and a heat responsive device for actuating said valve.

20. In combination, a burner, a conduit for supplying fuel thereto under pressure, a main valve associated with said conduit for controlling the flow of fuel to the burner, a fluid pressure motor having a diaphragm therein connected with the main valve for opening the same in response to the pressure of the fuel in said conduit, means including a valve device connecting the motor to the supply conduit in advance of the main valve, said valve device acting in one position to subject one side of the diaphragm to pressure from the supply conduit to open the main valve and in another position exhausting the motor on both sides of the diaphragm through the side thereof which is opposite that subjected to pressure to open the valve, and heat responsive means for actuating the three-way valve.

21. In combination, a burner, a conduit for supplying the fuel thereto under pressure, a main valve associated with said conduit for controlling the flow of fuel to the burner, a fluid pressure motor having a diaphragm therein connected with the main valve for opening the same in response to the pressure of the fuel in said conduit, a casing associated with the conduit and the motor and having three ports, two of which are oppositely disposed, and the third arranged intermediate the same, a valve member in said casing and movable between the oppositely disposed ports, three pipes, one connecting one of the valve controlled ports with the supply conduit in advance of the main valve and the other two pipes, respectively, connecting the other ports with the motor on opposite sides of the diaphragm, and a vent for the motor on the side of the diaphragm opposite that which is subjected to pressure to open the valve, and a heat responsive device for operating said valve in alternation with respect to the ports which it controls.

In witness whereof I hereto affix my signature.

ROY W. JOHNSON.